United States Patent [19]

Neely, Jr.

[11] 4,115,092

[45] Sep. 19, 1978

[54] METHOD AND APPARATUS FOR PREVENTING BUBBLE NUCLEATION AND GROWTH IN A MOLTEN GLASS DELIVERY FACILITY

[75] Inventor: James Edwin Neely, Jr., Butler, Pa.

[73] Assignee: PPG Industries, Inc., Pittsburgh, Pa.

[21] Appl. No.: 834,747

[22] Filed: Sep. 19, 1977

[51] Int. Cl.$^2$ ............................................. C03B 18/02
[52] U.S. Cl. .................................. 65/99 A; 65/182 R
[58] Field of Search ............................ 65/99 A, 182 R

[56] References Cited

U.S. PATENT DOCUMENTS 4,040,809  8/1977  Pecoraro et al. .................. 65/182 R
4,055,407  10/1977  Heithoff et al. ................. 65/99 A X Primary Examiner—Arthur D. Kellogg
Attorney, Agent, or Firm—E. Kears Pollock

[57] ABSTRACT

A method and apparatus are provided for inhibiting the generation, nucleation and growth of gas bubbles at a refractory surface in the vicinity of molten metal by providing a glaze of glass on the refractory surface, which glaze becomes viscous at the temperature reached in the apparatus during initiation of molten glass delivery such that some of the glaze is permitted to slough off from the refractory during initiation of molten glass delivery.

7 Claims, 4 Drawing Figures

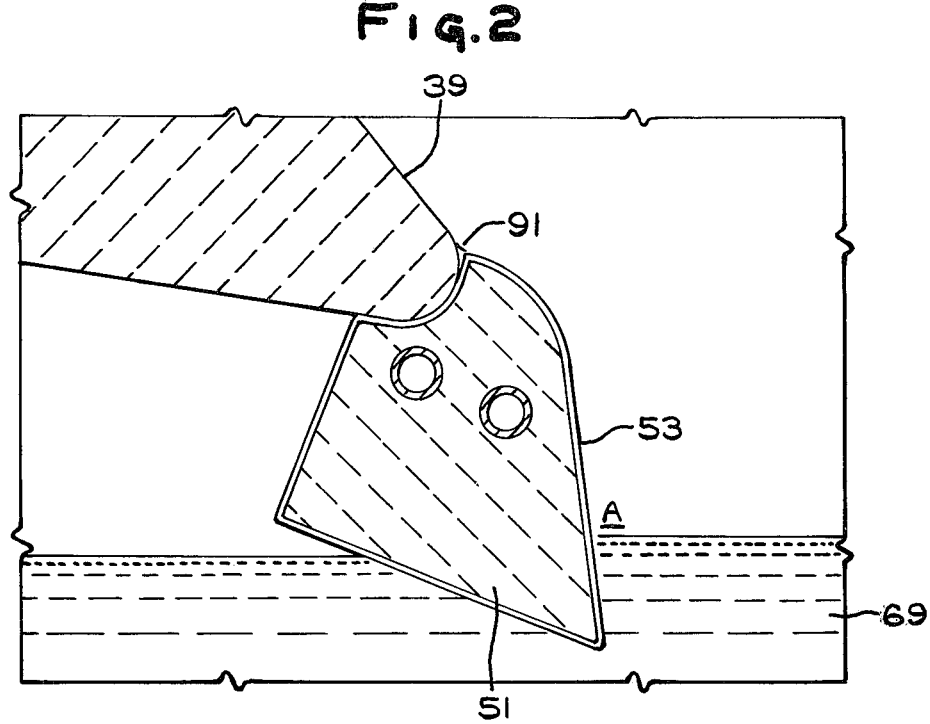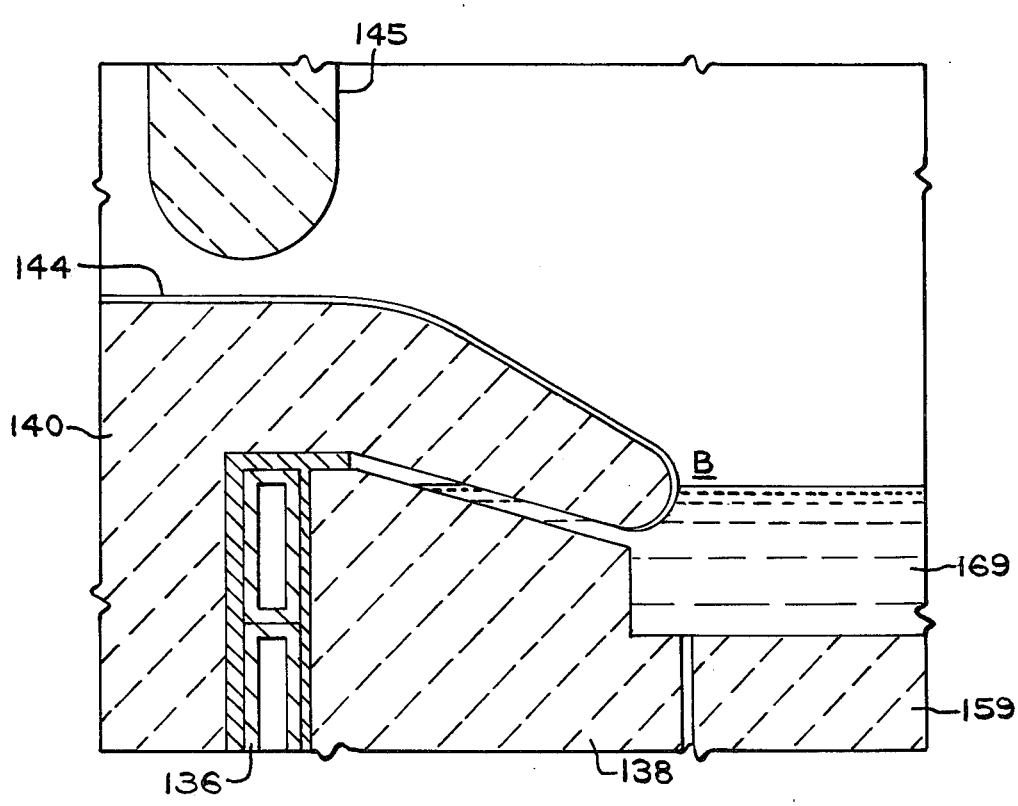

METHOD AND APPARATUS FOR PREVENTING BUBBLE NUCLEATION AND GROWTH IN A MOLTEN GLASS DELIVERY FACILITY

BACKGROUND OF THE INVENTION

1. Field of the Invention

This invention relates to the making of flat glass by a continuous process wherein glass is formed as a continuous sheet while supported and conveyed along the surface of a pool of molten metal. More particularly, this invention relates to an improved method for initiating the delivery of molten glass from a glass melting and refining furnace to a glass forming chamber.

2. Description of the Prior Art

It is known to form flat glass by delivering molten glass over a refractory support onto the surface of a pool of molten metal and to thereafter cool it and form it into a continuous sheet of glass.

U.S. Pat. No. 710,357 to Heal and U.S. Pat. No. 789,911 to Hitchcock individually show the delivery of molten glass over a rigid refractory member and from that member directly onto the surface of molten metal in a forming chamber.

U.S. Pat. No. 3,083,501 to Pilkington shows the delivery of molten glass over a refractory member and thereafter permitting it to fall freely onto the surface of a pool of molten metal for forming.

U.S. Pat. No. 3,843,346 and U.S. Pat. No. 3,884,665, both to Edge and Kunkle, describe the delivery of molten glass directly over a refractory support onto molten metal. U.S. Pat. No. 4,062,666 to Tilton and U.S. Pat. No. 4,055,407 to Heithoff and Pecoraro illustrate apparatus for delivering molten glass from a refractory glass support onto molten metal.

According to the teachings of these patents, a preferred refractory material to serve as a glass support member for delivery of molten glass onto molten metal is one comprising silica. The two patents to Tilton and to Heithoff et al. specifically suggest that the silica may be a fused quartz material.

It has been observed that fine bubbles or seeds occasionally occur in the bottom surface of glass produced by processes such as those described in the above-mentioned patents. These fine bubbles or seeds have been observed to occur most frequently immediately after the initiation of glass delivery and forming in newly constructed or repaired chambers. In the practice of the free-fall delivery method, the bubbles are generally concentrated in the marginal portions of the flat glass while they are more uniformly distributed throughout the bottom surface of flat glass produced following direct delivery without free fall. The present invention provides a method and apparatus for minimizing the incidences of bubbles or seeds in glass formed immediately after the initiation of glass forming in a forming facility and serves to increase the immediate productivity of a glass forming facility.

SUMMARY OF THE INVENTION

A glass forming chamber and its attendant molten glass delivery facility are prepared for the making of flat glass by heating the forming chamber and the molten glass delivery facility, including its refractory components, to a temperature within a range sufficient to melt metal within the forming chamber and provide a pool of molten metal, generally tin, in the forming chamber for receiving molten glass. During heatup, a protective atmosphere of inert-to-reducing gas is provided in the forming chamber. When the temperature of the forming chamber and the molten glass delivery facility has risen into a suitable range for receiving molten glass and after it has been established that the molten tin is relatively free of floating metal oxide or dross, the flow of molten glass through the delivery facility and into the forming chamber is initiated. The flow of glass is established over a glass-supporting refractory and from there onto the surface of the pool of molten metal contained within the forming chamber.

In accordance with this invention prior to the initiation of molten glass flow, there is established on the tin-contacting surfaces of a glass-supporting refractory of the delivery facility a glaze of glass, preferably a silica-containing glass, which becomes viscous at the temperatures to which the refractory is heated prior to the initiation of molten glass flow. During the initial molten glass flow, the temperature of the glass-supporting refractory is maintained sufficient to permit a portion of the glaze to slough off from the refractory and be removed from it by adherence to the molten glass. The glaze or layer of molten glass serves to protect the refractory from contamination by metal and metal oxides during the period of heatup prior to the initiation of molten glass flow. It also appears to prevent the formation of bubbles from gas evolved by dehydroxylation and other outgassing of the glass-supporting refractory. In particular, the surfaces of substantially pure silica refractories are protected in this manner.

In accordance with a preferred embodiment of this invention, the glaze of silica-containing glass established on the glass-supporting refractory is an essentially sulfate-free glaze. By providing a composition which is essentially sulfate-free, the risk of reaction between tin, comprising the principal constituent of a suitable glass-supporting molten metal, and sulfate-containing glass yielding gaseous sulfur dioxide which itself can cause the formation of bubbles or seeds in glass is minimized.

In practicing the present invention, a glaze having a thickness of from 0.005 to one-half inch (0.013 to 1.27 cm.) may be effectively employed, however, a glaze having a thickness of from about one-eighth inch to about three-eighth inch (0.32 to 0.96 cm.) is preferred. A glaze having a thickness within this preferred range provides a sufficient amount of material to slough off while leaving a sufficient layer to protect against bubble formation by dehydroxylation and outgassing of the refractory surface even as the temperature of the refractory may be permitted to reach a relatively high level causing the glaze to become substantially flowable. Having such a thick glaze is particularly useful where it is desired to shorten the time between the initial heatup of a forming chamber and the initiation of molten glass flow without waiting for absolute assurance that the molten metal is free of dross or metal oxide.

In accordance with a particularly preferred embodiment of this invention, all of the surfaces of a glass-supporting refractory, such as a lip or a threshold piece, are glazed with a glass. Although it is apparently sufficient to glaze only those surfaces which are expected to be contacted by molten tin during glass delivery onto molten metal, it has been found convenient to glaze all exposed surfaces of refractory pieces intended for glass-contacting support.

A suitable glaze may be prepared on the surface of a refractory by preparing a frit of finely divided glass particles, combining them with water and painting or otherwise spreading the frit over the surface of the refractory to be employed as a glass-supporting refractory in a molten glass delivery facility. Upon drying and heating, such a painted-on frit composition serves to glaze the surface. Heating to glaze the surface may be accomplished during the heating of the forming chamber and molten glass delivery facility, and it is suitable to provide a composition which becomes glazed at a temperature within the range of from 1300° to 1500° F. An alternative method of providing a suitable glaze on a refractory piece is to place a plate or sheet of glass on the surface to be provided with a glaze and heating the refractory with the plate or sheet of glass to a temperature on the order of 1300° to 1500° F. to sagmold the glass as a glaze against the surface of the refractory.

Suitable silica-containing compositions for glazing the surface of a glass-supporting refractory are shown in the following table:

TABLE I

SILICA GLAZES

| Composition A | | Composition B | |
|---|---|---|---|
| $SiO_2$ | 73 Percent | $SiO_2$ | 73 Percent |
| $Na_2O$ | 20 Percent | $Na_2O$ | 14 Percent |
| CaO | 5 Percent | CaO | 9 Percent |
| MgO | 2 Percent | MgO | 4 Percent |

Other glaze compositions, such as borate glasses, phosphate glasses and aluminate glasses may also be used. The following representative compositions are viewed as potential glazes since they are expected to behave as viscous liquids at typical molten glass delivery temperatures.

TABLE II

BORATE, PHOSPHATE AND ALUMINATE GLAZES

| | Borate Crown Glass % by weight | Phosphate Crown Glass % by Weight | Aluminate Glass % by Weight |
|---|---|---|---|
| $B_2O_3$ | 64 | 3 | — |
| $Na_2O$ | 8 | — | — |
| $K_2O$ | 3.5 | — | — |
| BaO | 3.5 | 37 | 15.4 |
| PbO | 3 | — | — |
| $Al_2O_3$ | 18 | 1.5 | 28.6 |
| $As_2O_3$ | — | 1.5 | — |
| $P_2O_5$ | — | 57 | — |
| $Li_2O_3$ | — | — | 3.6 |
| MgO | — | — | 4 |
| CaO | — | — | 28 |
| BeO | — | — | 10 |
| SrO | — | — | 10.4 |

In its aspect as an apparatus, the present invention comprises an apparatus for delivering molten glass onto a pool of molten metal for forming into flat glass, which includes a glass-supporting, silica-containing refractory member for contacting and supporting the molten glass during its delivery and immediately prior to its delivery onto the molten metal. The apparatus further includes a semi-adherent glaze of glass, preferably a silica-containing glass, disposed on the tin-contacting surfaces of the silica-containing refractory. The semi-adherent glaze is present on the glass and tin-contacting refractory prior to first contact by molten glass during use of the molten glass delivery facility.

This invention may be further appreciated with reference to the accompanying drawings.

BRIEF DESCRIPTION OF THE DRAWINGS

FIG. 2 is an enlarged sectional elevation of a portion of the facility illustrated in FIG. 1 to show in detail the glassy glaze on a glass-contacting refractory employed in the apparatus;

FIG. 4 is an enlarged sectional elevation of a portion of the delivery facility illustrated in FIG. 3.

DESCRIPTION OF THE PREFERRED EMBODIMENTS

Figure 1:
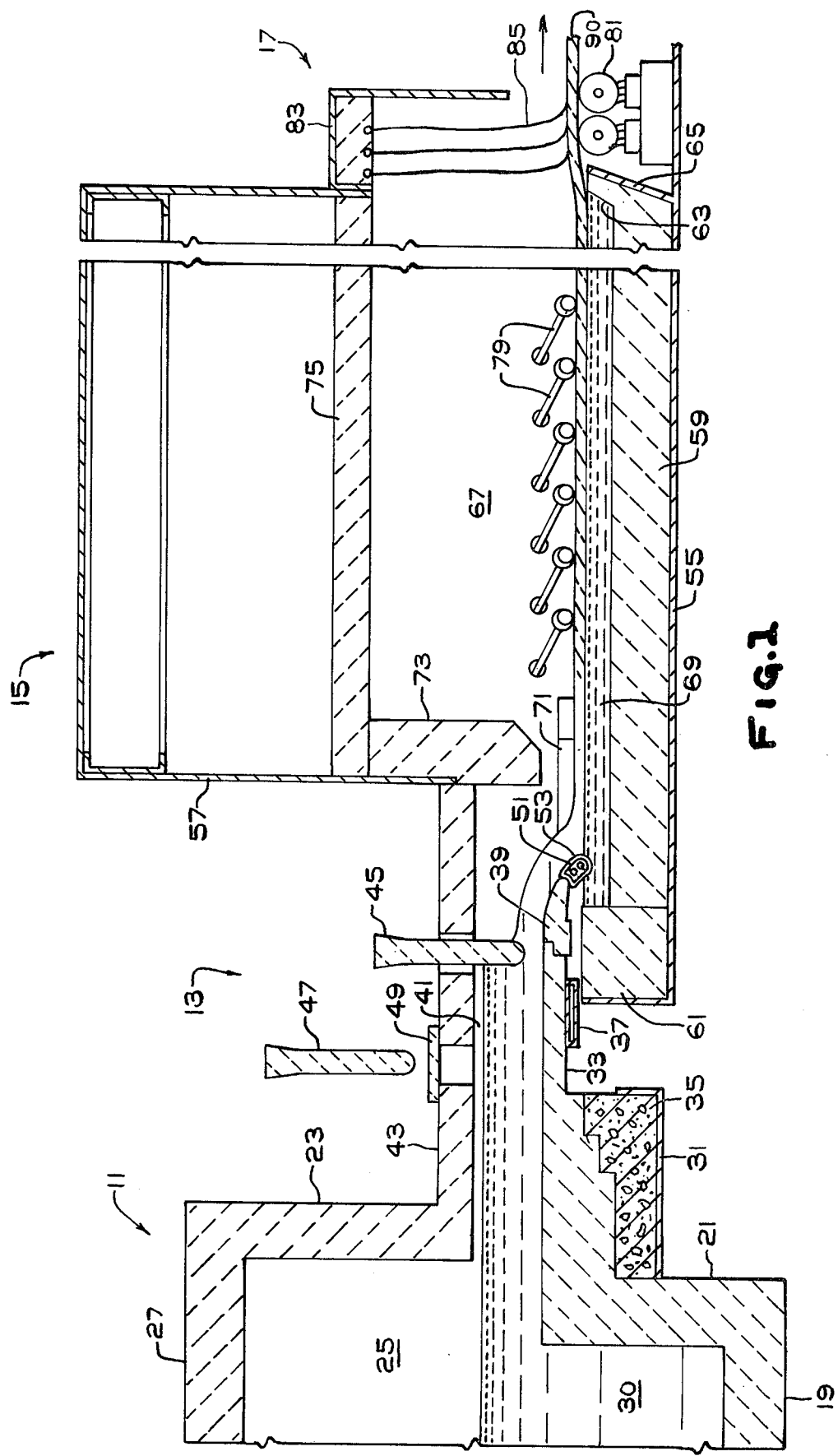
FIG. 1 is a longitudinal sectional elevation of a flat glass-making apparatus including a glass forming chamber and molten glass delivery facility modified in accordance with this invention.

Referring now to FIGS. 1 and 2 there is shown a facility for making flat glass employing the principles of this invention. A glass-making furnace or tank 11, terminating in a refiner or conditioner, is connected through a molten glass delivery facility 13 to a glass forming chamber 15, which, in turn, is connected to a glass lift-out and removal facility 17. The glassmaking furnace 11 includes a bottom 19, a front basin wall 21, an upper front wall 23, side walls 25 (including a lower basin portion and an upper portion) and a crown 27 extending between the side walls 25. A pool of molten glass 30 is maintained within the furnace 11 during operation.

The molten delivery facility 13 includes a canal casing 31 having disposed within it a canal bottom 33. Canal insulation 35 may be provided within the structure as well. A support structure which may include a cooler 37 is provided beneath the canal bottom 33 to support it. At the downstream end of the canal at its end remote from the furnace 11, there is provided a refractory lip 39. The delivery facility 13 further includes canal side walls 41 which may include jambs. A canal roof 43 extends over the canal between the side wall 41. An operating tweel or metering member 45 extends downwardly through an opening in the canal roof 43 and across the canal between its side walls. The tweel is mounted by means (not shown) for raising and lowering it to control the size of an opening through which molten glass may be delivered from the furance 11 to the forming chamber 15 for forming. A backup tweel 47 is also provided. A cover tile 49 may be provided over an opening for receiving the backup tweel 47 when it is not in use. The backup tweel 47 serves to shut off the flow of molten glass into the vicinity of the lip 39 prior to the initiation of glass manufacture and during periods of maintenance on the lip or the forming chamber. In accordance with a preferred embodiment, a lip extension piece 51 is provided. The lip extension piece 51 is preferably made of a silica refractory and extends the lip 39 into contact with molten metal upon which glass is to be formed in the forming chamber. The lip extension piece 51 is provided with a glaze 53 in accordance with this invention.

The forming chamber 15 includes a bottom casing 55 and an upper casing 57. Disposed within the bottom casing 55 is a refractory bottom 59 and, at the inlet or upstream end, there is provided a wall or wetback block 61. At the exit or downstream end of the forming chamber there is provided a lip 63 within a lip casing 65. The chamber further includes side walls 67. The side walls 67, entrance wall 61 and lip 63, along with the bottom 59, provide a container. Disposed within the container is a pool of molten metal 69, preferably tin.

Diverging guides 71 are provided in the inlet end of the forming chamber in a preferred embodiment. The diverging guides 71 extend in the direction of glass movement downstream from the lip 39 and the lip extension piece 51 and serve to confine the initially delivered molten glass allowing for its controlled widening to a desired width for forming. The diverging guides 71 are preferably made of materials such as silica or alumina that are wetted by molten glass according to the teachings of U.S. Pat. No. 3,432,285 to Gulotta.

The forming chamber 15 further includes an entrance end lintel 73 extending across the entrance or inlet end of the forming chamber. A ceiling or roof 75 extends across and along the length of the forming chamber separating the forming chamber into a lower space called a headspace above the pool of molten metal and an upper space called a plenum or service space above the roof and inside the upper casing 57.

A plurality of edge rolls 79 may be provided for engaging the marginal edge portions of glass being formed in the chamber in order to provide attenuating and traction forces to the glass. These may be used to provide for the maintenance of the width of an advancing layer of glass or for the controlled reduction in width of glass during its formation.

The glass lift-out and removal facility 17 includes lift-out rolls 81 and an exit canopy 83 extending over the lift-out rolls. Curtains 85 are mounted in the exit canopy and depend from it into close proximity to the lift-out rolls for engaging the upper surface of a ribbon of glass 90 being withdrawn from the forming chamber.

Referring now specifically to FIG. 2, there is shown in detail the presence of a glaze 53 about all surfaces of a lip extension piece 51. This detailed view is an illustration prior to the initiation of molten glass flow so no layer of molten glass is present. The glaze is shown as fusing the lip extension piece 51 to the lip 39 and such fusion will occur as the assembly is brought to a sufficient temperature to make the glaze viscous. With a sufficiently thick glaze 53 provided on a lip extension piece 51, fusion will provide for the filling of the space 91 between the lip 39 and the lip extension piece 51 with the viscous glassy material of the glaze. During start-up metal oxide or dross may form on the surface of the molten metal 69 adjacent the innerface between the glaze 53 and the surface of the pool of molten metal 69 as indicated at "A." Once molten glass flow is initiated over the lip 39 and over the lip extension piece 51 onto the surface of the pool of molten metal 69, it picks up and carries loose dross with it from the region "A." Inasmuch as the glaze 53 is viscous and may be sloughed from the lip extension piece 51, any dross which has adhered to the glaze 53 during heat-up is trapped by the sloughed-off glaze with the moving molten glass and immediately carried away from the region "A" so that the surface of the lip extension piece 51 as it engages the surface of the pool of molten metal 69 is completely cleaned. Thus, no dross is present to cause the development of bubbles or seeds at the location of molten glass delivery. Additionally, sufficient glaze 53 remains on the surface of a lip extension piece 51 such that, when employing a silica lip extension piece, bubble formation from dehydroxylation and other outgassing of the silica is inhibited. Again, this serves to prevent the occurrence of bubbles or seeds in the glass being delivered over the lip extension piece 51.

Figure 3:
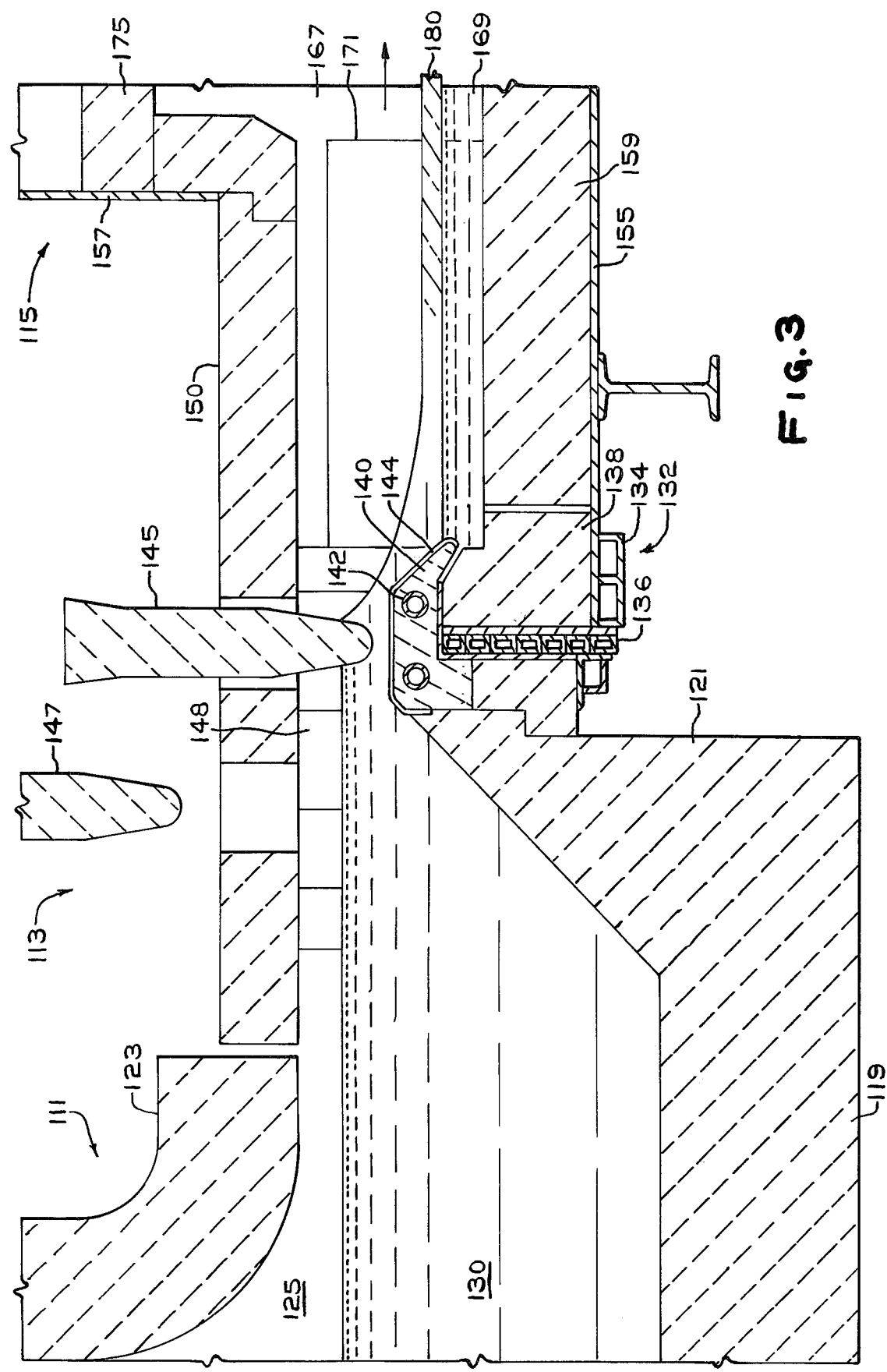
FIG. 3 is a longitudinal sectional elevation of an alternative molten glass delivery facility showing the modification comprising the present invention.

Referring now to FIGS. 3 and 4, there is shown another embodiment of this invention. A furnace or tank 111 is connected through a molten glass delivery facility 113 to a forming chamber 115. The furnace or tank, like that for the previously described embodiment, includes a bottom 119, a front basin wall 121, a front wall 123, side walls 125 and a crown (not shown). It contains a pool of molten glass 130 during operation.

The molten glass delivery facility of this embodiment of the invention includes a threshold assembly 132 having a cooler support 134. Inside the threshold assembly is a vertical cooler 136. The threshold assembly 132 further includes a base block 138 and a glass support block 140. Extending through the glass support block 140 are coolers 142. A glaze containing silica 144 is disposed over the glass and tin-contacting surfaces of the glass support block 140. An operating tweel 145 extends downwardly toward the glass support block 140 and is mounted for vertical movement in order to meter the flow of molten glass over the glass support block 140. A back-up tweel 147 is also provided for closing off the flow of molten glass prior to the initiation of glass flow and at other times for periodic maintenance. The tweels 145 and 147 extend downwardly between jambs 148. The jambs 148, along with the tweel 145 and the glass support block, provide an opening of controlled size through which molten glass is to be delivered during operation. A roof 150 extends over the threshold assembly 132.

The glass forming chamber 115 includes a bottom casing 155 and an upper casing 157. A refractory bottom 159 is provided inside the bottom casing 155. Side walls 167 are also provided. A pool of molten metal 169 is contained in the chamber. In accordance with a preferred embodiment, wetted refractory guides 171 extend in a downstream direction from the threshold assembly 132. A ceiling or roof 175 extends over the pool of molten metal 169 maintained in the forming chamber. During operation, a layer or body of molten glass is delivered over the glass support block 140 and onto the surface of the pool of molten metal 169 in the forming chamber. Once delivered, it is advanced along the surface of the pool of molten metal 169 and is cooled and attenuated to form a continuous ribbon of glass which is then withdrawn from the forming chamber.

Referring now specifically to FIG. 4, which shows the assembly prior to the initial delivery of molten glass, a silica-containing glaze 144 extends along the glass-contacting surfaces of the glass support block 140 and around the downstream face of the threshold assembly to beneath the surface of the pool of molten metal 169 which is contacted by the glass-supporting surface of the threshold assembly. During startup, the assembly and the forming chamber are heated until the metal 169 is fully melted. In general, a layer or scattered particles of metal oxide or dross will exist on the surface of the pool of molten metal 169. A reducing atmosphere is provided in the space above the pool of molten metal. As the assembly is heated, the glaze 144 becomes viscous. In the absence of any forces applied to it, the viscous layer retains its shape and remains adherent to the glass support block 140. When a suitable temperature is achieved, the back tweel 147 is raised and molten glass flows against the operating tweel 145 and, with it in a raised position as shown in FIG. 4, beneath it and along the glazed surface of the glass support block 140 directly onto the surface of the pool of molten metal 169. The glaze 144, being viscous, partly adheres to the molten glass flowing over it. Any dross or metal oxide in the vicinity "B" of the refractory metal interface is trapped and carried from region "B" by the flowing molten glass in the sloughed-off glassy glaze material 144 adhering to it. Sufficient glaze 144 remains on the tin-contacting surface of the glass support block 140 so that a glass support block comprised of silica does not form discrete bubbles from dehydroxylation or other outgassing of the silica refractory, thereby preventing any significant generation of bubbles or seeds in glass being delivered over it.

While this invention has been described with reference to particularly preferred embodiments, those skilled in the art will recognize that variations may be made from the disclosed preferred embodiments without departing from the spirit of the disclosed invention as defined in the appended claims.

I claim:

1. In an apparatus for delivering molten glass onto a pool of molten tin-containing metal for forming into flat glass which includes a glass-supporting, silica-containing refractory member for supporting molten glass immediately prior to its delivery onto the molten metal which member is contacted by glass and tin, the improvement comprising a semi-adherent glaze of glass which behaves as a viscous liquid at molten glass delivery temperatures disposed on glass and tin-contacting surfaces of the silica-containing refractory member wherein said glass is disposed on such surfaces prior to first contact by molten glass being delivered thereover.

2. The apparatus according to claim 1 wherein the glaze is a silica-containing glass.

3. In a method of preparing a flat glassmaking apparatus for use in the manufacture of flat glass by delivering molten glass over a glass-supporting, silica-containing refractory member to a forming chamber onto a glass-supporting surface of a pool of molten tin-containing metal and thereafter cooling and forming the glass into a continuous sheet of glass, wherein the glass-supporting refractory is mounted in place, the forming chamber and refractory are heated to a temperature within range sufficient to provide a pool of the metal in a molten state and for receiving molten glass, providing a protective atmosphere in the forming chamber and initiating the flow of molten glass over the glass-supporting refractory and onto the pool of molten metal; the improvement comprising establishing on glass and tin-contacting surfaces of the glass-supporting refractory a glaze of glass which becomes viscous at the temperature to which the refractory is heated prior to initiation of molten glass flow; and maintaining the temperature of the glass-supporting refractory sufficient during initial molten glass flow to permit a portion of the glaze to slough off from the glass-supporting refractory and be removed by adherence to the molten glass.

4. The method according to claim 3 wherein the glass is a silica-containing glass.

5. The method according to claim 4 wherein the glaze of silica-containing glass is established as an essentially sulfate-free glaze.

6. The method according to claim 3 wherein the glaze of glass is established with a thickness of from about 0.005 to 0.5 inch prior to heating in preparation for receiving molten glass.

7. The method according to claim 3 wherein substantially all exposed surfaces of the glass-supporting refractory have the glaze of glass established on them.

* * * * *